United States Patent [19]

Mathews et al.

[11] Patent Number: 4,689,145
[45] Date of Patent: Aug. 25, 1987

[54] DRY WELL FILTRATION SYSTEM

[76] Inventors: Lester R. Mathews, 3858 E. Cholla La., Phoenix, Ariz. 85028; John A. Work, 8407 Shoreway Dr., Indianapolis, Ind. 46240

[21] Appl. No.: 892,047

[22] Filed: Aug. 1, 1986

[51] Int. Cl.⁴ ............................................. B01D 36/04
[52] U.S. Cl. ..................... 210/170; 210/260; 210/265; 210/287; 210/299; 210/306; 210/316; 210/317; 210/333.01; 210/335; 210/339; 210/427
[58] Field of Search ............... 210/153, 251, 163, 803, 210/164, 804, 165, 806, 166, 807, 170, 252, 263, 259, 265, 260, 285, 262, 286, 295, 287, 299–301, 303, 305, 306, 310, 311, 333.01, 314, 316, 335, 339, 317, 800, 801, 427

[56] References Cited
U.S. PATENT DOCUMENTS 1,166,802  1/1916  Albert et al. .................. 210/320
4,116,835  9/1978  Bertelson ...................... 210/317

Primary Examiner—Frank Sever
Attorney, Agent, or Firm—LaValle D. Ptak

[57] ABSTRACT

A filtration system is provided for a dry well in the form of a buffer tank made of concrete to remove sediment and pollutants from water supplied from a header to an inlet pipe in the tank, so that the water exiting from an outlet pipe is free of particulate matter and pollutants. This is accomplished by providing a sediment pit and a baffle at the inlet side of the tank and then passing the water through a multiple stage set of filters having different aperture sizes. These filters remove particles and pollutants from the water as it passes through the buffer tank on its way to a dry well drain pipe attached to the outlet of the buffer tank.

24 Claims, 11 Drawing Figures

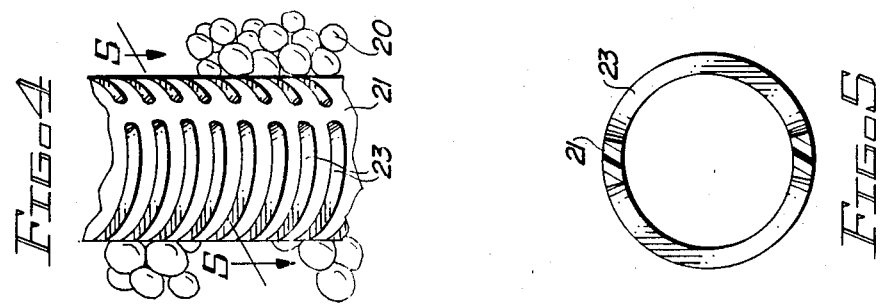
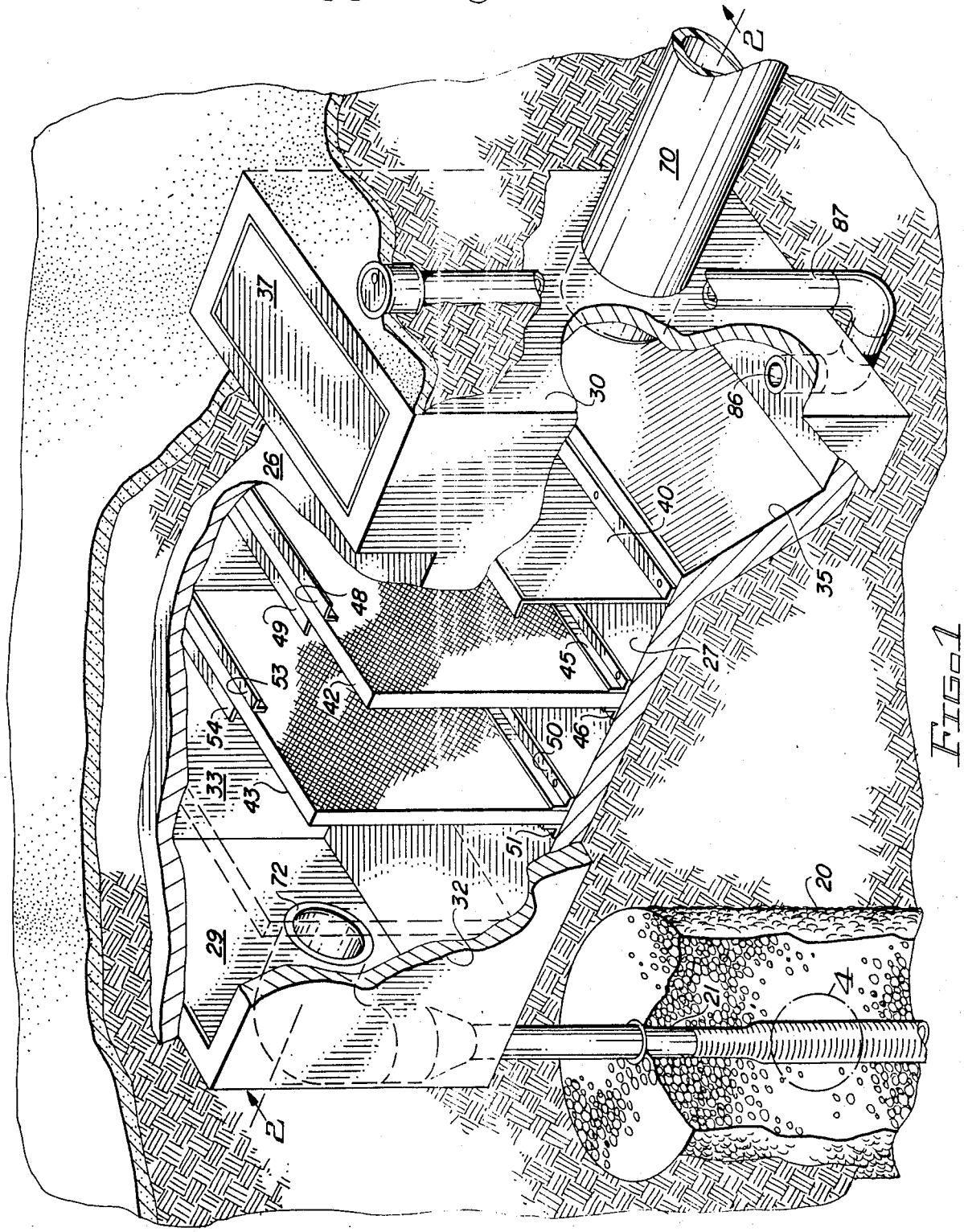

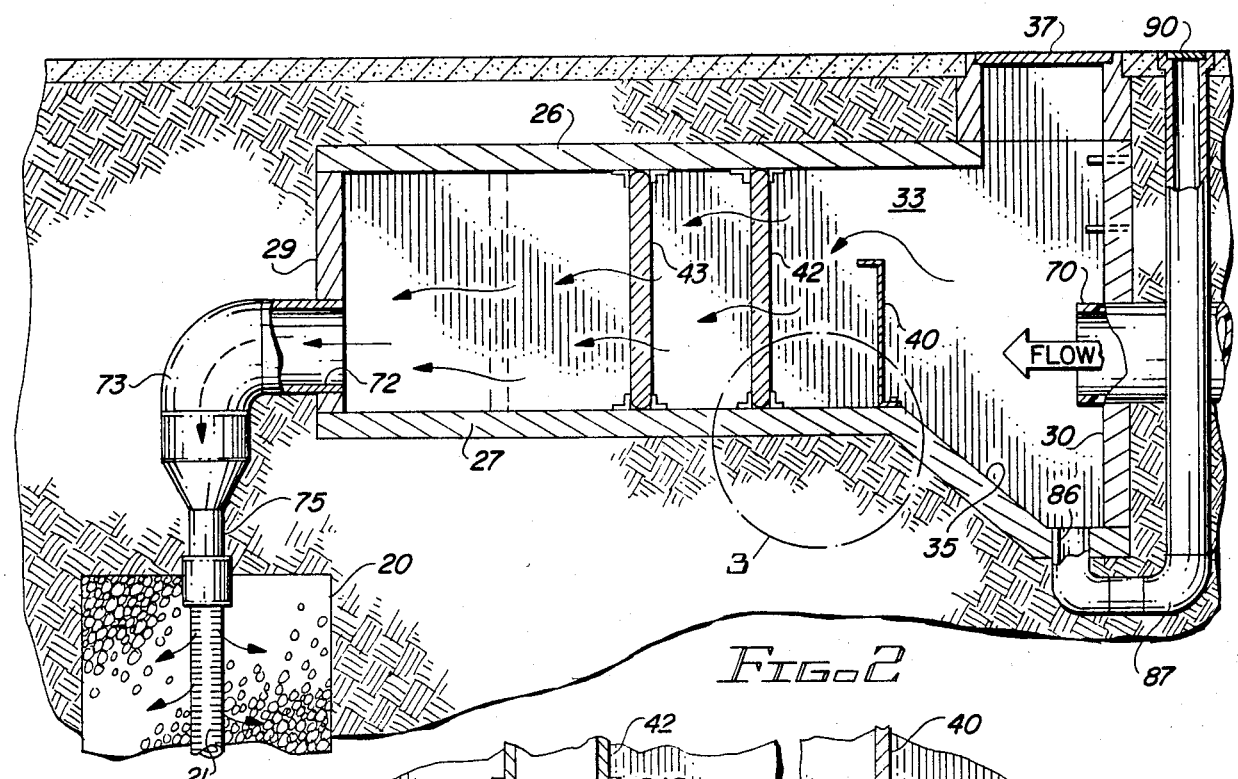
FIG.-2
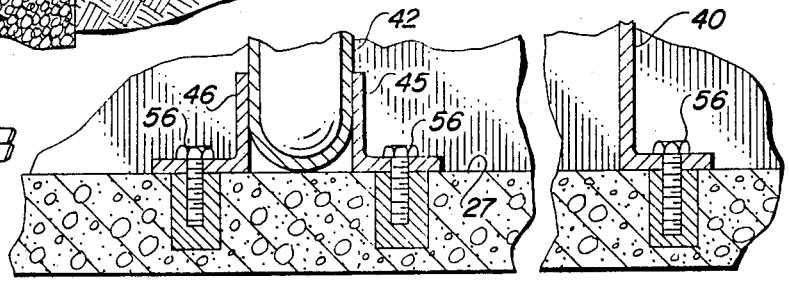
FIG.-3
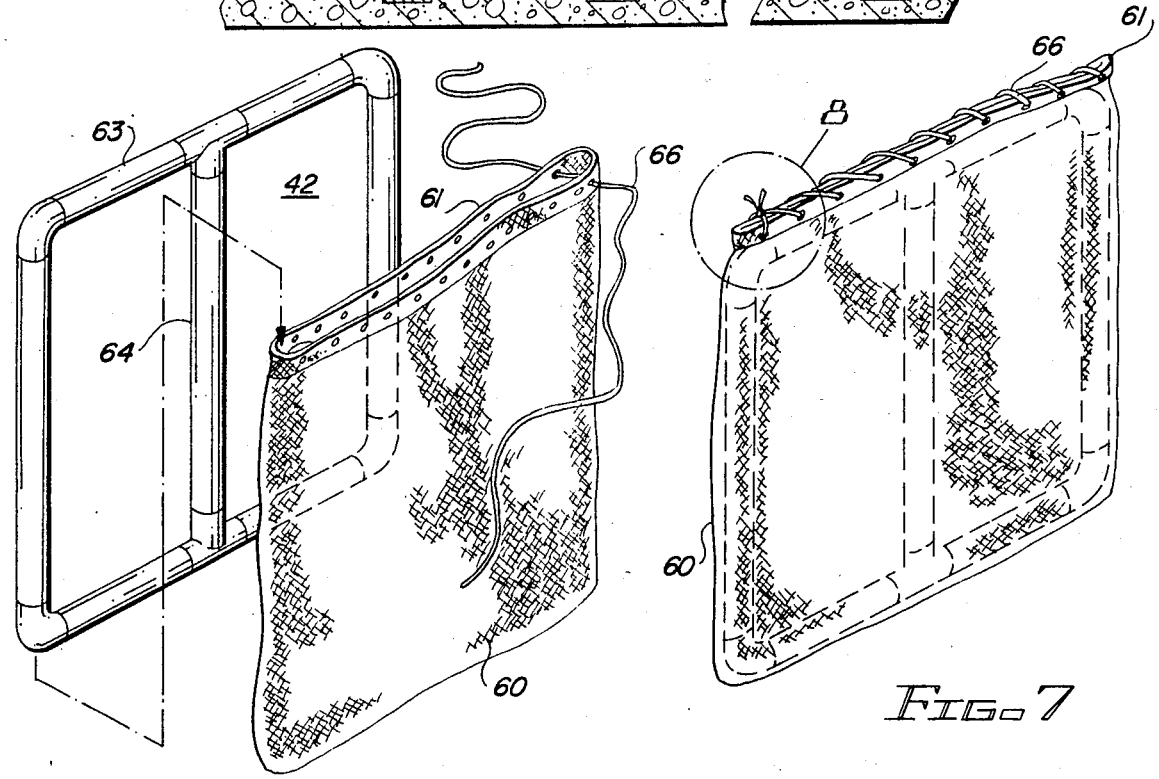
FIG.-6
FIG.-7

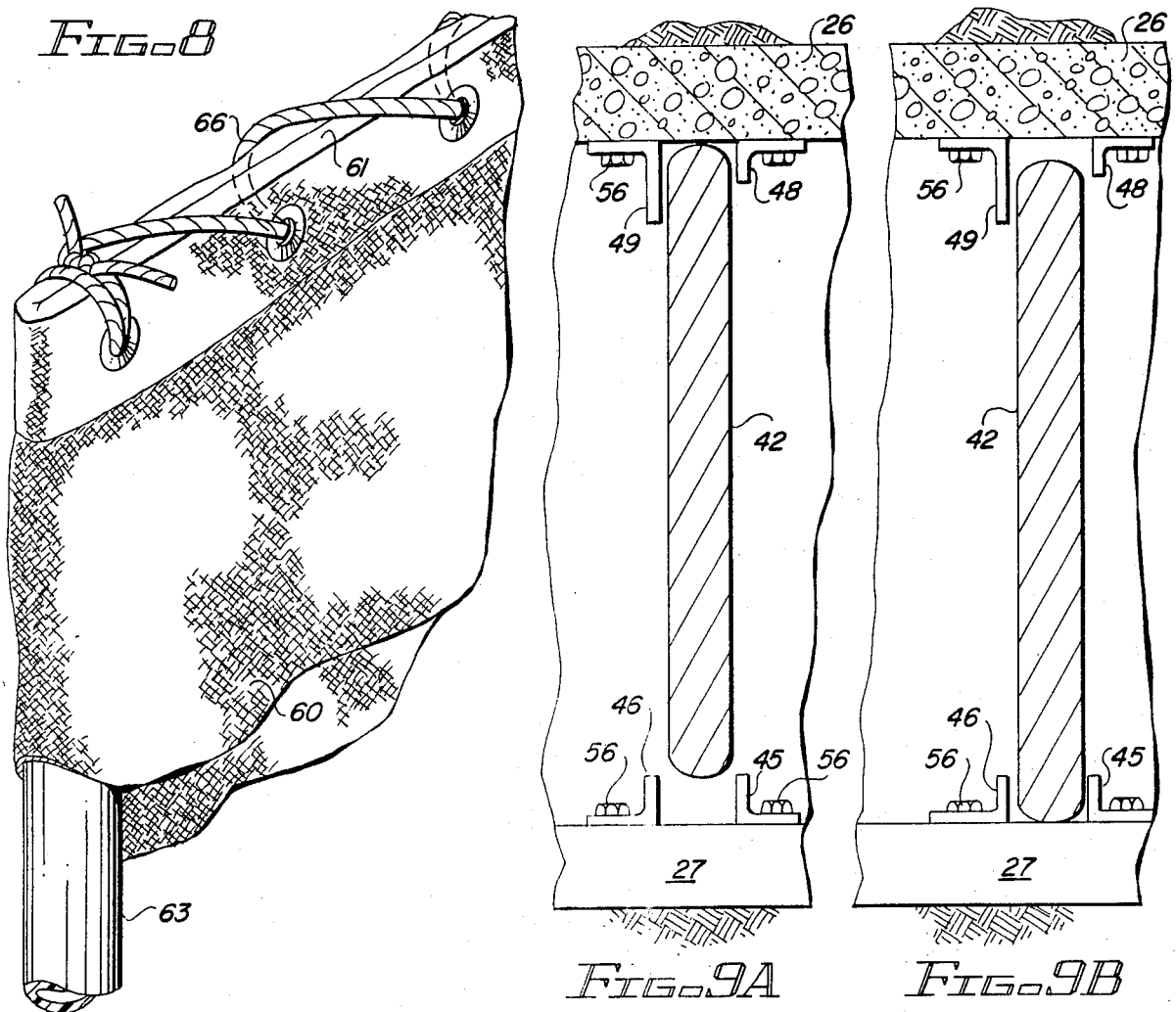
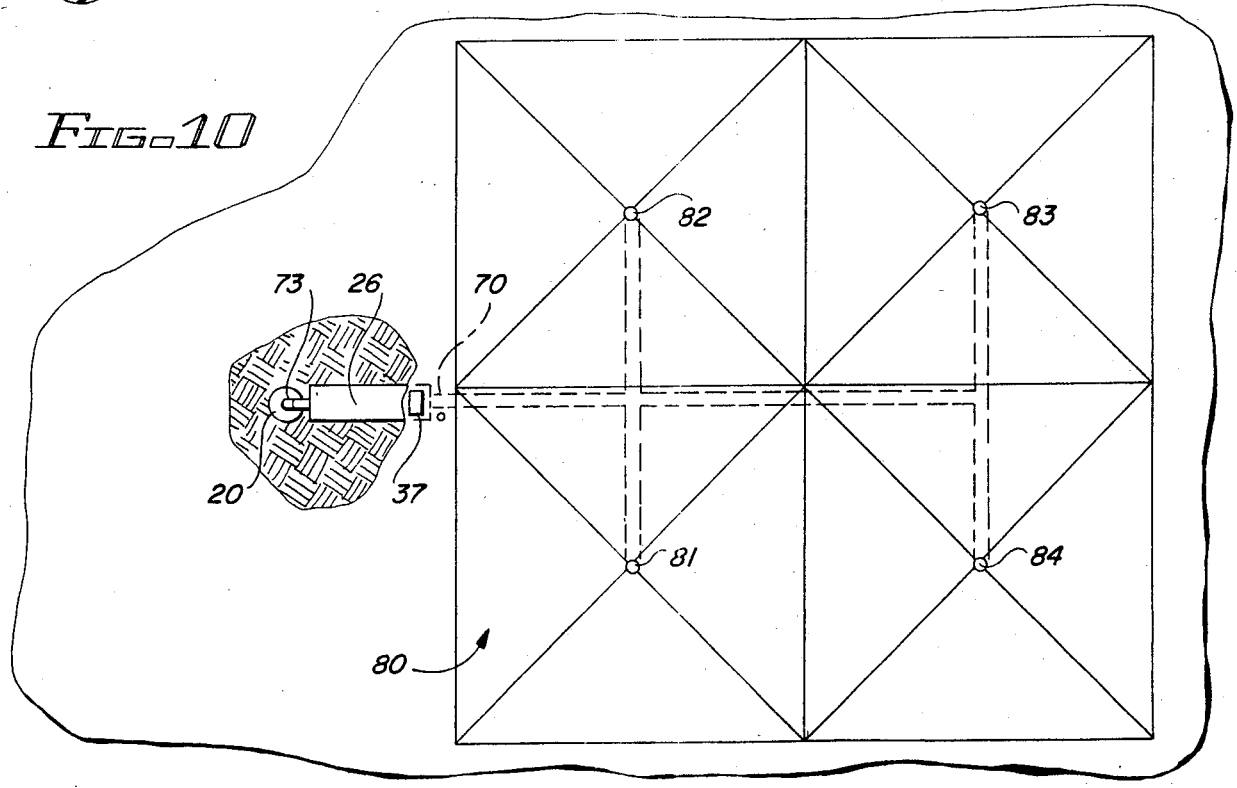

DRY WELL FILTRATION SYSTEM

BACKGROUND

In cities, particularly large metropolitan areas, as more and more of the land surface becomes covered with buildings or paved with streets, parking lots, and the like, a significant problem exists with respect to the disposal of the water run-off which occurs during rain storms. Parking lots and streets typically are built with slopes toward storm drain outlets which empty into underground storm sewers. These sewers usually run underneath the streets; and in many cities, the storm sewers are several feet in diameter. Even so, storm sewers frequently are overloaded and are unable to carry off the water which is dumped into them during rain storms of even moderate intensity. When storm sewers are unable to carry off the run-off water, streets, parking lots and buildings frequently become flooded, with resultant traffic tie ups and damage to buildings and the contents of such buildings wherever such flooding occurs.

Another problem which exists is that run-off water from storms is highly polluted. This water picks up oil and gasoline drippings from the roads along with other pollutants. Because of the seriousness of such pollution, such water should be processed to remove the pollutants before returning it to streams and rivers. This however, rarely is done today because of the enormous costs of providing processing plants for handling storm water drain off. Most sewage treatment plants are capable of handling only the normal sewage requirements and do not have the capacity of handling the enormously large excesses for processing storm water along with conventional waste disposal.

In many cities, particularly in the southwest, a solution to the ever increasing overloading of storm sewers has been to provide what are known as "dry-well" waste water disposal wells for localized sites where large parking lots and developments are constructed. Such dry wells typically are made by drilling a 4 ft. diameter hole in the ground to a depth of 40 to 75 ft. This hole is filled with washed gravel and a perforated sewage drain pipe, of the type typically used in drain fields for septic tanks, is inserted vertically into the center of the dry well to extend throughout the length or depth of the dry well. Water from the parking lot or other area to be controlled drains into the top of this pipe and is dispersed into the dry well. This approach to elimination of the overloading of storm sewers has proved to be quite successful. In some areas of the southwest, enough water is returned to the ground water table to stabilize the ground water level where the level prior to the construction of dry wells has been steadily dropping over a period of many years.

Problems still exist, however, with respect to dry well disposal of rain water run off. One of the most significant problems is that sand and silt which is washed from the areas being drained relatively quickly clogs the gravel around the drain holes in the drain pipe in the dry well; so that as time goes by, any given dry well is capable of handling less and less water run off. A point finally is reached when the best solution simply is to drill another dry well near the one which has become clogged. Water then is diverted to this new dry well. This is a relatively expensive solution, however, as is readily apparent.

A second problem which is also becoming of increasing significance is that the water returned to the ground water table through dry wells is polluted with oil and gasoline and other pollutants. In some sections of the country, sufficient pollution is being added to the ground water to threaten the use of such ground water subsequently for drinking water.

Unless the above mentioned problems with dry well systems are overcome, many cities are seriously considering banning further construction of run-off water systems incorporating dry wells. Accordingly, it is desirable to provide a system for use with dry wells which prevents clogging of the dry wells and which is capable of removing pollutants from the water returned to the dry well; so that the beneficial characteristics of dry wells may continue to be used without the above-noted disadvantages.

SUMMARY OF THE INVENTION

Accordingly, it is an object of this invention to provide an improved dry well system.

It is another object of this invention to provide an improved filtration system for a dry well.

It is an additional object of this invention to provide a filtration system with replaceable elements for a dry well.

It is a further object of this invention to provide a filtration system for a dry well which prolongs the useful like of the dry well.

In accordance with a preferred embodiment of this invention, a filtration system for a dry well is connected between the incoming header pipe for the region being drained and the drain pipe of the dry well. The system comprises a buffer tank in the form of a generally elongated concrete box having a water inlet at one end and a water outlet at the other end. The water outlet is connected to the dry well drain pipe. A baffle is provided in the tank. The baffle extends from side to side and from the bottom to a predetermined distance from the top near the inlet pipe end of the tank end to prevent water flow in a straight line from the inlet pipe to the outlet. Filters are provided in the tank and extend from side-to-side and top to bottom, so that water passing through the tank must pass through the filters. The filters are located between the baffle and the water outlet to prevent particles of greater than a predetermined size from passing through the filters to the water outlet.

BRIEF DESCRIPTIONS OF THE DRAWINGS

FIG. 1 is a partially cut-away perspective view of a preferred embodiment of the invention;

FIG. 2 is a side cross-sectional view of the embodiment shown in FIG. 1;

FIG. 3 is an enlarged detail of a portion of the embodiment shown in FIG. 1;

FIGS. 4 and 5 are details of a portion of the embodiment shown in FIG. 1;

FIG. 6 is an exploded perspective view of a filter element useful in the embodiment of FIG. 1;

FIG. 7 is an assembled perspective view of the filter element of FIG. 6;

FIG. 8 is an enlarged detail of a portion of the structure shown in FIG. 7;

FIGS. 9A and 9B are partial cross-sectional views showing the manner of insertion and removal of a filter element of the embodiment of FIG. 1; and FIG. 10 is top plan view of the drain field of a system employing the embodiment of FIG. 1.

DETAILED DESCRIPTION

Reference now should be made to the drawings in which the same reference numbers are used throughout the different figures to designate the same or similar components. Initially reference should be made to FIGS. 1 and 2. The filtration system for a dry well is shown as being used with a standard dry well 20 comprising a 4 ft. diameter cylindrical excavation filled with washed gravel. This is illustrated in FIGS. 1 and 2 near the lower left portion of both figures. The manner in which the dry well is made is not important to an understanding of the present invention. Such dry wells typically have a drain pipe 21 passing through the central axis of the dry well and embedded in the washed gravel which fills the well 20. The depth of dry wells in most locations averages around 50 ft., and such dry wells range in depth from 15 ft. to 60 ft. or 75 ft. The washed gravel filling the well 20 typically is comprised of stones from ¾" to 1½" in diameter.

Conventional dry wells use a drain pipe 21 having circular holes or perforations throughout the length of the pipe. Such holes, however, can be blocked by some of the gravel and are relatively quickly blocked by silt and other residue which passes into the pipe from the area being drained into the dry well. To facilitate the passage of water out of the pipe 21 and to prevent clogging by the gravel, the pipe 21 in the embodiment which is disclosed has circumferential slots 23 cut into it at relatively closely spaced intervals throughout its length. This is shown most clearly in FIG. 4. These slots have a width which is less than the smallest diameter of the gravel used to fill the dry well 20, and the spacing between the slots is approximately equal to their width. A relatively small interconnecting web of the pipe 21 is left in the axial direction to provide support for the slotted portions of the pipe. This is illustrated most clearly in FIG. 5. Typically the pipe 21 has a diameter of 6", although larger or smaller diameter pipes 21 can be used, depending upon the requirements of a particular installation.

Normally the parking lot, road, or other area to be drained simply connects with the upper end of the pipe 21 through a suitable grating located in the road or parking lot; so that water draining from the area passes directly into the top of the pipe. In accordance with the present invention, however, this does not occur. Water instead is passed into a buffer tank made of concrete, having a width and height each equal to approximately 4 ft. and having a length of approximately 10 to 12 ft. for a typical installation. The concrete tank comprises a top 26, a bottom 27, opposed ends 29 and 30, and a pair of elongated sidewalls 32 and 33. At the water inlet end of the tank, there is a depression or trough region 35 which is at a greater depth than the bottom 27 of the remainder of the tank. This region 35 constitutes a silt and gravel trap from which silt and gravel subsequently can be removed. To insure that the heavier particles of silt and gravel fall into the region 35, a baffle plate 40, typically made of steel or the like, extends across the width of the tank and is mounted along the upper left edge of the well 35. The plates 40 is located to extend into the path of water flow from a water inlet pipe 70 connected into the center of the end 30 of the tank. This is shown most clearly in FIG. 2. The height of the baffle plate 40 is selected to be slightly over ½ the interior height of the tank so that ample space exists to permit water to flow over the top of the baffle 40 into the remainder of the buffer tank toward the water outlet 72 provided in the center of the outlet end 29 of the tank.

Between the baffle 40 and the outlet 72, two woven polypropylene screen filter elements 42 and 43 are provided. These filter elements extend across the full width of the tank and from the top to bottom; so that water passing through the tank from the pipe 70 to the outlet 72 must pass through these filters. Various types of filters may be used, but it has been determined that woven polypropylene bags are relatively inexpensive and are highly suitable for the intended purpose. Typically these filters have front and back surfaces spaced approximately 2" apart.

The construction of the filters 42 and 43 is shown most clearly in FIGS. 6 and 7. An internal rectangular framework made of 2" PVC, Schedule 40, Pipe is provided. This framework has external dimensions selected to cause the filter to extend fully across the interior of the buffer tank. If desired, a central support 64 may be provided to maintain the spacing of the two sides of a bag 60 forming the filter material. For the first stage or first filter 42, the apertures provided in the woven material typically are approximately 0.05 microns. The spacing of the apertures of the filters element 43 typically is much smaller, in the range of 0.01 microns. Both filters, however, are constructed in the same manner as illustrated in FIGS. 6 and 7 for the filter 42.

The frame 63, 64 is inserted into the bag 60. Along the top of the bag is a reinforced band 61 having a plurality of eyelets in it. After the frame 63 is inserted into the bag, a nylon cord 66 is threaded through the eyelets and tied at the ends to secure the bag 60 onto the frame 63. This is shown most clearly in FIG. 7 and in the enlarged portion of the assembly illustrated in FIG. 8.

The completed filter then is held in place in the buffer tank between parallel pairs of lower and upper angle supports, typically made of steel. The lower supports for the filter 42 are illustrated in detail in FIGS. 3, 9A, and 9B. These supports have a substantially L-shaped cross-section and are secured to the floor 27 of the buffer tank by means of suitable fastener bolts 56. Similarly, the upper support for the filter comprises a pair of parallel elongated angle supports 48 and 49 extending across the width of the top of the tank 26. The support 49 has a downwardly projecting leg which is longer than the corresponding part of the support 48, as illustrated most clearly in FIGS. 9A and 9B. This provides a firm upper support for the pressure exerted against the filter elements 42 and 43 when water is passing through the tank from the inlet pipe 70 to the outlet 72 connected to the outlet pipe 73. Although FIGS. 3, 9A, and 9B are directed to a detailed illustration of the filter element 42, it should be understood that the manner in which the filter element 43 is held in place is identical to that illustrated for the filter element 42.

FIGS. 9A and 9B show the manner in which the filter element may be inserted and removed by first placing it against the lip 49 of the upper support member and pushing it into contact with the top 26 of the tank. In this position, sufficient clearance is provided to permit the bottom of the filter element 42 to be swung over the top of the members 45 and 46. Once the filter is in position as shown in FIG. 9A, it then is permitted to drop by gravity into the position shown in FIG. 9B. It will remain in this position until it is removed by a reversal of the above noted process. It also is possible to provide the depending portion of the member 48 with a length similar to that of the portion 49 and simply remove the member 48 by unbolting it from the top 26 if this alternative method of installing and removing the filters 42 and 43 is desired. Other techniques for removably holding the filters 42 and 43 in place also may be utilized if desired.

As illustrated in dotted lines in FIGS. 1 and 2, a third or additional filter stage also may be employed if desired. Typically such a third stage has a filter element with an aperture size or a porosity sufficient to block molecules of substances such as gasoline, oil, cleaning solvents, et cetera, while permitting water to pass freely through such third stage. At the very least, the filter stages should remove all suspended particulate matter from the water flowing through the buffer tank; so that the dry well 20 does not subsequently become clogged with silt, sand and the like.

The outlet end of the tank 72 is connected through a pipe 73 and a reducing pipe 75 to the top of the drain pipe 21 in the dry well 20, as illustrated most clearly in FIG. 2. Periodically it may be desirable to clean the accumulated sand and silt from the well 35. To facilitate such cleaning, a manhole cover 37 may be utilized and the sand and silt may be removed by any suitable manner through the cover 37. Alternatively, a drain hole 86 may be placed in the bottom of the well 35 and connected through a pipe 87 to an outlet 90 externally accessible from the top of the ground as shown most clearly in FIGS. 1 and 2. A water backwash may then be applied through the manhole cover 37 to facilitate the pumping of the silt and sand laden residue from the opening 86 to the pipe 87 and out of the opening 90 by means of any suitable apparatus. Also, whenever the filter elements 42 and 43 become clogged, or at periodic intervals, the bags 60 comprising these elements may be removed from their supporting frame 63 and replaced with new bags. As a result the buffer tank functions as a renewable filter which has an indefinite life and which also substantially extends the useful life of the dry well 20 with which the filtration system is used.

FIG. 10 illustrates a typical installation using the filtration system shown in the other figures of the drawings. The dry well 20 and the top of the buffer tank 27 are shown in the left-hand portion of FIG. 10. Also shown is the manhole cover 37 and the water inlet pipe 70 along with the water outlet elbow 73. A typical parking lot 80 of the type which may be connected to the water inlet pipe 70 is illustrated. The parking lot 80 is divided into 4 quadrants, each of which has its lowest point or depression formed in its center. The centers of each of these quadrants are shown at 81, 82, 83, and 84. All of these points are connected to open drain pipes covered by a suitable grid of the type normally used for such parking lot installations. These drains are connected together through a pipe network assembly shown in dotted lines in FIGS. 10 to the input of the water inlet pipe 70. Whenever a rain occurs, the water and residue present on the parking lot drains into the drains 81, 82, 83, and 84, and passes through the buffer tank (shown by its top 26) and outward from the tank through the pipe 73 into the drain pipe 21 for the dry well 20. Various other types of installations, other than the parking lot shown in FIG. 10, may be utilized.

The foregoing description of the preferred embodiment and the manner in which this embodiment is depicted in the various figures of the drawings, is to be considered illustrative of the invention and not as limiting. Various changes and modifications will occur to those skilled in the art without departing from the true scope of the invention. For example, relative dimensions have been given for the various parts of the embodiment, but these dimensions may be varied in accordance with different installations. The number of filtration stages also maybe varied as well as the type of filter material and the manner in which the filters are changed or replaced.

We claim:

1. A filtration system comparising: means for minimizing clogging of a dry well by silt and gravel and removing suspended particles from water entering a dry well including in combination:
    a buffer tank having a top, bottom, first and second sides, and first and second ends, with a water inlet at said first end and a water outlet at said second end;
    means for connecting said water outlet to a dry well drain pipe;
    means for connecting said water inlet to a source of water input;
    baffle means for trapping silt and gravel to prevent such silt and gravel from reaching said water outlet, said baffle means comprising a baffle plate in said tank extending from said first side to said second side and from said bottom to a predetermined distance from said top near said first end and located with respect to said water inlet to prevent water flow in a straight line from said water inlet to said water outlet; and
    filter means for removing suspended particles from water passing through said tank, said filter means including a filter member in said tank and extending from said first side to said second side and extending substantially from said top to said bottom, said filter member located between said baffle plate and said water outlet to prevent particles of greater than a predetermined size carried by water flowing through said water inlet from passing through said filter member to said water outlet.

2. The combination according to claim 1 wherein said buffer tank is an underground tank and has a lower portion in the bottom thereof between said water inlet and said baffle plate for accumulating sediment therein.

3. The combination according to claim 2 further including means for removably holding said filter member in place in said tank.

4. The combination according to claim 3 wherein said means for holding said filter member comprises a first set of spaced bracket means extending across the bottom of said tank and a second set of spaced bracket means extending across the top of said tank, each of said sets of spaced bracket means having a portion extending toward the interior of said tank for holding said filter member therebetween.

5. The combination according to claim 4 wherein said filter member comprises first and second filters, each extending across the width of said tank from said first side to said second side and from said top to said bottom, said first and second filters each having different aperture sizes therein, with said first filter being located nearest said baffle plate and having larger apertures than said second filter.

6. The combination according to claim 5 further including a dry well drain pipe connected by said connecting means to said water outlet, said dry well drain pipe extending into said dry well and having a plurality of spaced circumferential slots therein for permitting water to exit therefrom.

7. The combination according to claim 6 wherein the slots in said dry well drain pipe are selected to have a width less than the diameter of gravel particles used to fill said dry well.

8. The combination according to claim 7 wherein said first and second filters comprise removable bags of polypropylene material each placed over a frame member.

9. The combination according to claim 8 wherein said frame member is made of PVC pipe.

10. The combination according to claim 9 wherein said bags are closed on three sides, and on the top sides thereof have a removable fastener to secure each of said bags on said frame members.

11. The combination according to claim 10 wherein said bracket means each have a uniform L-shaped cross-section.

12. The combination according to claim 11 wherein said buffer tank is made of concrete.

13. The combination according to claim 12 further including means for facilitating the removal of sediment from said lower portion of said buffer tank.

14. The combination according to claim 1 wherein said filter member comprises first and second filters, each extending across the width of said tank from said first side to said second side and from said top to said bottom, said first and second filters each having different aperture sizes therein, with said first filter being located nearest said baffle plate and having larger apertures than said second filter.

15. The combination according to claim 14 wherein said first and second filters are removable filters.

16. The combination according to claim 1 further including a dry well drain pipe connected by said connecting means to said water outlet, said dry well drain pipe extending into said dry well and having a plurality of spaced circumferential slots therein for permitting water to exit therefrom.

17. The combination according to claim 16 wherein the slots in said dry well drain pipe are selected to have a width less than the diameter of gravel particles used to fill said dry well.

18. The combination according to claim 1 further including means for removably holding said filter member in place in said tank.

19. The combination according to claim 18 wherein saidmeans for holding said filter member comprises a first set of spaced bracket means extending across the bottom of said tank and a second set of spaced bracket means extending across the top of said tank, each of said sets of spaced bracket means having a portion extending toward the interior of said tank for holding said filter member therebetween.

20. The combination according to claim 19 wherein said sets of bracket means each have a uniform L-shaped cross-section.

21. The combination according to claim 1 further including means for facilitating the removal of sediment from said lower portion of said buffer tanks.

22. The combination according to claim 1 wherein said filter member comprises a removable bag of polypropylene material placed over a frame member.

23. The combination according to claim 22 wherein said frame member is made of PVC pipe.

24. The combination according to claim 23 wherein said bag is closed on three sides and on the top side thereof has a removable fastener to secure said bag on said frame.

* * * * *